United States Patent
Jeansonne et al.

(10) Patent No.: US 10,416,717 B2
(45) Date of Patent: Sep. 17, 2019

(54) CONFIGURING DOCKS

(71) Applicant: HEWLETT-PACKARD DEVELOPMENT COMPANY, L.P., Houston, TX (US)

(72) Inventors: Jeffrey Kevin Jeansonne, Houston, TX (US); Rahul V. Lakdawala, Houston, TX (US); Roger D. Benson, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/081,620

(22) PCT Filed: Oct. 24, 2016

(86) PCT No.: PCT/US2016/058506
§ 371 (c)(1),
(2) Date: Aug. 31, 2018

(87) PCT Pub. No.: WO2018/080432
PCT Pub. Date: May 3, 2018

(65) Prior Publication Data
US 2019/0064879 A1   Feb. 28, 2019

(51) Int. Cl.
*G06F 1/16*      (2006.01)
*G06F 13/38*     (2006.01)
*G06F 13/12*     (2006.01)

(52) U.S. Cl.
CPC .......... *G06F 1/1632* (2013.01); *G06F 13/126* (2013.01); *G06F 13/38* (2013.01);
(Continued)

(58) Field of Classification Search
CPC ...... G06F 1/1632; G06F 13/38; G06F 13/126; G06F 13/385
See application file for complete search history.

(56) References Cited

U.S. PATENT DOCUMENTS

| 5,873,000 A | 2/1999 | Lin et al. |
| 7,688,281 B2 * | 3/2010 | Watanabe ............ G09G 3/3611 345/102 |

(Continued)

FOREIGN PATENT DOCUMENTS

| TW | 201348921 A | 12/2013 |
| TW | 201537333 A | 10/2015 |

(Continued)

OTHER PUBLICATIONS

Barrett et al., "Intel Announces Broadwell vPro Processors: Wireless Docking and More", Retrieved from Internet: http://www.anandtech.com/show/8943/intel-announces-broadwell-vpro-processors-wireless-docking-and-more, Jan. 29, 2015, pp. 1-8.

(Continued)

*Primary Examiner* — Nimesh G Patel
(74) *Attorney, Agent, or Firm* — Trop, Pruner & Hu, P.C.

(57) ABSTRACT

In some examples, an electronic device is to receive a configuration setting that is configurable to a first setting to indicate a first mode of operation, and a second setting to indicate a second mode of operation, wherein a feature supported by the first mode of operation is disabled in the second mode of operation; and configure a dock to which the electronic device is connected to operate according to a mode indicated by the configuration setting.

18 Claims, 6 Drawing Sheets

(52) U.S. Cl.
CPC .... *G06F 13/385* (2013.01); *G06F 2213/0026* (2013.01); *G06F 2213/0042* (2013.01)

(56) References Cited

U.S. PATENT DOCUMENTS

| | | | |
|---|---|---|---|
| 9,026,712 | B2 | 5/2015 | Kwidzinski et al. |
| 9,411,551 | B2* | 8/2016 | Haren .................... G06F 3/038 |
| 2004/0174338 | A1* | 9/2004 | Scott .................... G06F 1/1632 345/156 |
| 2005/0060470 | A1 | 3/2005 | Main et al. |
| 2013/0162515 | A1 | 6/2013 | Prociw et al. |
| 2016/0139640 | A1 | 5/2016 | Hijazi et al. |
| 2016/0191313 | A1 | 6/2016 | Chen et al. |
| 2016/0195897 | A1 | 7/2016 | Robinson et al. |
| 2016/0378704 | A1* | 12/2016 | Adamson .............. G06F 13/364 710/104 |

FOREIGN PATENT DOCUMENTS

| | | |
|---|---|---|
| TW | 201544960 A | 12/2015 |
| TW | M514025 U | 12/2015 |
| WO | 2011007332 A1 | 1/2011 |

OTHER PUBLICATIONS

Hewlett-Packard Company et al., "Universal Serial Bus 3.1 Specification", Revision 1.0, Jul. 26, 2013, 631 pages.

Hewlett-Packard Company et al., "Universal Serial Bus Type-C Cable and Connector Specification", Revision 1.0, USB 3.0 Promoter Group, Aug. 11, 2014, pp. 1-171.

"HP Elite x2 1012 G1—12"—Core M7 6Y75—8 GB RAM—256 GB SSD—with HP, 2015", Retrieved from Internet: https://www.cdw.com/shop/products/HP-Elite-x2-1012-G1-12in-Core-M7-6Y75-8-GB-RAM-256-GB-SSD-with-HP/3972863.aspx, 2016, pp. 1-11.

Intel Corporation, "Universal Serial Bus Power Delivery Specification", Revision 2.0, Version 1.2, Mar. 25, 2016—ECNs Aug. 2, 2016, pp. 1-552.

PCI Express, "Base Specification", Revision 4.0, Version 0.3, Feb. 19, 2014, pp. 1-1053.

Dell, "Precision M4800", Retrieved from Internet: http://www.dell.com/us/business/p/precision-m4800-workstation/pd, 2016, pp. 1-13.

Ziller, "Thunderbolt™ 3—The USB-C That Does It All", Thunderbolt Technology Community, Retrieved from Internet: https://thunderbolttechnology.net/blog/thunderbolt-3-usb-c-does-it-all, Jun. 2, 2015, pp. 1-5.

Vandewege et al., "Active Management Technology: The Obscure Remote Control in Some Intel Hardware", Free Software Foundation, 2016, pp. 1-2.

Wikipedia, "Intel vPro Technology", Retrieved from Internet: https://en.wikipedia.org/w/index.php?title=Intel_vPro&oldid=738365509, 2016, pp. 1-18.

PCWorld, "How Intel Turned Thunderbolt from a Failure into a Success", Jun. 2, 2016, pp. 1-6.

* cited by examiner

CONFIGURING DOCKS

BACKGROUND

Electronic devices can be used by users to perform various tasks. Some electronic devices are portable or handheld electronic devices that can be carried with users.

BRIEF DESCRIPTION OF THE DRAWINGS

Some implementations of the present disclosure are described with respect to the following figures.

DETAILED DESCRIPTION

Figure 1:
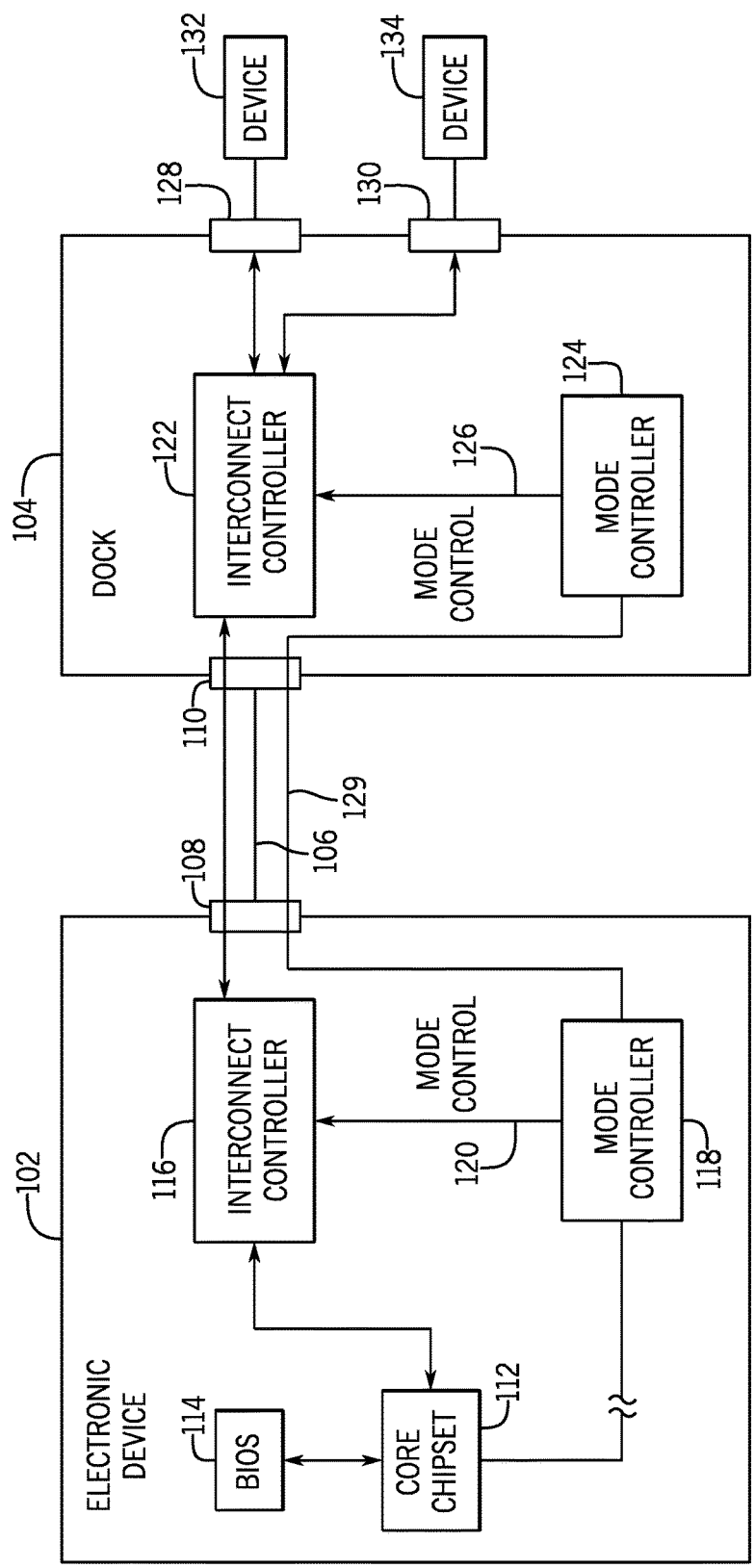
FIG. 1 is a block diagram of an arrangement that includes an electronic device and a dock according to some examples.

In the present disclosure, the article "a," "an", or "the" can be used to refer to a singular element, or alternatively to multiple elements unless the context clearly indicates otherwise. Also, the term "includes," "including," "comprises," "comprising," "have," or "having" is open ended and specifies the presence of the stated element(s), but does not preclude the presence or addition of other elements.

An electronic device can be connected to a dock that has ports for connection to various other devices, such as a display device, a user input device, a storage device, a network, and so forth. Examples of electronic devices include any or some combination of the following: portable electronic devices such as notebook computers, convertible computers, and so forth; handheld electronic devices such as tablet computers, smart phones, game appliances, and so forth; wearable devices such as smart watches, smart eyeglasses, head-mounted devices, and so forth; and other types of electronic devices.

A dock can support certain features, such as remote management of an electronic device connected to the dock. Remote management allows a remote device to monitor the electronic device over a network, and to perform various management tasks over the network with respect to the electronic device. The management tasks can include controlling, updating, or monitoring the electronic device. As examples, the management tasks can include any or some combination of the following: remotely powering up, powering down, or power cycling the electronic device; remotely booting the electronic device; monitoring packets communicated with the electronic device to detect for malware; isolating or blocking a port or restricting a communication rate of the port of the electronic device; remotely configuring the electronic device; and so forth. An example of remote management is according to the Active Management Technology (AMT) from Intel Corporation. The AMT feature can be provided by processors or chipsets that include the vPro™ technology from Intel Corporation. In other examples, remote management of a device can be supported using processors or chipsets from other vendors.

A dock can additionally or alternatively support the THUNDERBOLT 3 hardware interface, which allows for the dock to connect to display devices and/or other devices at high speeds. THUNDERBOLT 3 is developed by Intel Corporation, and the THUNDERBOLT 3 hardware interface supports communications over a communications medium at high speeds via a Universal Serial Bus (USB) Type-C (USB-C) connector, and can alternatively support the communications of signals of different protocols over the USB type-C port. More generally, the THUNDERBOLT 3 hardware interface is an example of a hardware interface that supports high-speed communications and multiple different protocols. The different protocols can include any or some combination of the following: a Native THUNDERBOLT protocol that tunnels Peripheral Component Interconnect (PCI-E) and Display Port (DP), a Native Universal Serial Bus (USB3) only protocol, a Native Display Port (DP) protocol only, a Simultaneous Native USB3 and reduced bandwidth Display Port, and other protocols.

A version of the USB protocol is the Universal Serial Bus 3.1 Specification, Revision 1.0, dated Jul. 26, 2013. The DP protocol provides a digital display interface and is developed by the Video Electronics Standards Association (VESA). A version of DP is described in Display Port™ Standard Version 1.4, dated Mar. 1, 2016. A version of PCI-E is described in PCI Express® Base Specification, Revision 4.0, Version 0.3, dated Feb. 19, 2014. PCI-E is a serial computer expansion bus standard that can be used to interconnect various electronic components.

Although specific versions of protocols are identified, it is noted that in other examples, techniques or mechanisms according to some implementations can be used with other versions of the identified protocols, whether previous versions or future versions.

The ability of the dock to support remote management and THUNDERBOLT 3 communications can be associated with various issues. For example, THUNDERBOLT 3 allows for direct memory access (DMA) of a memory space of an electronic device, where the memory space of the electronic device can be accessed by a remote device (connected to the dock) without involving a processor of the electronic device. This DMA capability can expose the electronic device to an attack by the remote device using THUNDERBOLT 3 access, where the remote device can read the memory space of the electronic device to gain unauthorized access to information of the electronic device.

In further examples, the ability to perform remote management of an electronic device can add complexity associated with performing a remote boot of the electronic device or awakening the electronic device from a lower power state to a higher power state.

Although reference is made to remote management (e.g., AMT management) and THUNDERBOLT 3 as examples of features that can be supported by a dock, it is noted that in other examples, a dock can support other or additional features that can present other issues.

Some customers may not desire to have various features (e.g., remote management, THUNDERBOLT 3 communications, etc.) provided by a dock. As a result, such customers are unlikely to purchase docks having such features, which can lead to lost sales opportunities for a manufacturer or seller of the dock.

In accordance with some implementations of the present disclosure, a dock can be configured to operate in a selected mode of multiple different modes of operation. The different modes of operation can support respective different features of the dock. For example, in a first mode of operation, both remote management of an electronic device connected to the dock and communications provided by a high-speed, multi-protocol hardware interface (e.g., the THUNDERBOLT 3 hardware interface) are supported. In a second mode of operation, the remote management feature is disabled, but high-speed, multi-protocol hardware interface is enabled. In a third mode of operation, both the remote management feature and high-speed, multi-protocol hardware interface are disabled. When the high-speed, multi-protocol hardware interface is enabled, communications involves a communications speed over a communication medium that is greater than when the high-speed, multi-protocol hardware interface is disabled.

The selective configuration of the dock to the selected mode can be performed by the electronic device according to a configuration setting received by the electronic device. The configuration setting received by the electronic device can be responsive to a user selection to set operation of the electronic device to a selected one of multiple different modes. For example, the configuration setting can include a Basic Input/Output System (BIOS) setting, which is a setting of a BIOS program in the electronic device. In other examples, the configuration setting received by the electronic device can be responsive to a selection by a program (e.g., an operating system, an application program, or other machine-readable instructions) or a machine to set operation of the electronic device to a selected one of multiple different modes.

FIG. 1 is a block diagram of an example arrangement that includes an electronic device 102 and a dock 104 to which the electronic device 102 can be connected, such as over a cable 106. In some examples, the dock 104 is a universal dock that is capable of operating with any or various different types of electronic devices that have different features. A universal dock is distinguished between a dedicated dock that can operate with just a single type of electronic device.

The cable 106 in some examples can include an electrical cable that includes electrical wires to communicate signals between the electronic device 102 and the dock 104. In other examples, the cable 106 can include an optical cable that includes optical communication paths between the electronic device 102 and the dock 104. In yet further examples, the cable 106 can include both electrical wires and optical communication paths.

The electronic device 102 includes a port 108, and the dock 104 includes a port 110. The ports 108 and 110 can also be referred to as docking ports, since they are used to dock the electronic device 102 to the dock 104. The cable 106 can interconnect the ports 108 and 110. In alternative examples, instead of using the cable 106 to interconnect the electronic device 102 and the dock 104, the ports 108 and 110 can be part of mating connectors that can physically and communicatively connect to each other. Whether the ports 108 and 110 are linked by a cable or are directly mated, a communications bus is provided between the electronic device 102 and the dock 104.

In some examples, the communications bus between the electronic device 102 and the dock 104 can include a Universal Serial Bus Type-C (USB-C) bus. USB-C is provided by the USB Implementers' Forum (USB-IF). In some examples, a version of the USB-C Specification is the Universal Serial Bus Type C Cable and Connector Specification Revision 1.0, Aug. 11, 2014. In further examples, USB-C can refer to earlier or later generations or versions of the USB-C specification, or standards that are derived from the USB-C specification.

Although reference is made to USB-C in some examples, it is noted that in other examples, the communications bus between the electronic device 102 and the dock 104 can be according to different protocols.

The electronic device 102 includes a core chipset 112, which in some examples include a processor, a graphics controller, and an input/output (I/O) hub, such as the Platform Controller Hub (PCH) from Intel Corporation or another type of I/O hub from other vendors. In some cases, any one or some combination of the processor, graphics controller, and I/O hub can be combined into a single integrated circuit (IC) chip, instead of being implemented as multiple separate IC chips.

The electronic device 102 also includes a basic input/output system (BIOS) module 114, which includes machine-readable instructions that are using for booting the electronic device 102 and to perform other tasks. The BIOS module 114 is the program that initially starts when the electronic device 102 is first started from a power off or lower power state. The BIOS module 114 can also refer to Unified Extensible Firmware Interface (UEFI) machine-readable instructions that can be used for starting the electronic device 102.

The electronic device 102 further includes an interconnect controller 116, which is connected to the port 108. The interconnect controller 116 is able to communicate signals of different protocols over the cable 106 or other communications bus, depending on which mode of operation is activated. The electronic device 102 further includes a mode controller 118 that can provide a mode control indication 120 (which can include a signal, an information element, or a message) to the interconnect controller 116, to selectively set the interconnect controller 116 to one of multiple different modes of operation.

A "controller" can refer to a hardware processing circuit, such as a microprocessor, a core of a multi-core microprocessor, a microcontroller, a programmable gate array, a programmable integrated circuit device, or another hardware processing circuit. A "controller" can refer to a single IC chip, or to multiple IC chips.

In some examples, the mode controller 118 can selectively set the interconnect controller 116 to one of several different modes of operation based upon a configuration setting (e.g., a BIIOS setting) received by the BIOS module 114. For example, the BIOS module 114 can present a user interface screen that includes user selectable options. The user of the electronic device 102 can specify, using the user selectable options, which of the multiple different modes of operation is to be activated.

In other examples, the configuration setting can be automatically set by the BIOS module 114, or by another entity in the electronic device 102, such as an operating system, an application program, and so forth. In further examples, an operating system, an application program, or other machine-readable instructions can present a user interface screen to allow a user to select a configuration setting to control the mode of operation of the electronic device 102, and correspondingly, the dock 104 to which the electronic device 102 is connected.

The dock 104 includes an interconnect controller 122, which is connected to the port 110 of the dock 104. The interconnect controllers 116 and 122 cooperate with each other to perform communications between the electronic device 102 and the dock 104, as well as with external devices (e.g., 130, 132) connected to device ports 128 and 130 of the dock 140. The interconnect controller 122 in the dock 104 can be selectively set to one of different modes of operation by a mode controller 124 in the dock 104. The mode controller 124 can provide a mode control indication 126 to the interconnect controller 122 to set the selected mode of operation.

In some examples, the mode controller 118 in the electronic device 102 and the mode controller 124 in the dock 104 can communicate with each other over the communications bus between the electronic device 102 and the dock 104 for discovery of features of the electronic device 102 and the dock 104, and to perform configuration, such as to configure a mode of operation of the dock 104.

In examples where the communications bus between the electronic device 102 and the dock 104 is a USB-C bus, the mode controllers 118 and 124 can include USB Power Delivery (PD) controllers. A USB PD controller operates according to the USB Power Delivery Specification, which can be used to manage power delivery between different devices, such as the electronic device 102 and the dock 104. A version of the USB PD Specification is the Universal Serial Bus Power Delivery Specification, Revision 2.0, V1.2, Mar. 25, 2016. In other examples, a different version of the USB PD Specification can be employed.

The USB-C bus includes a Configuration Channel (CC), which the USB PD controllers in the electronic device 102 and the dock 104 can employ, upon cable detection (such as detection of the cable 106 that interconnects the electronic device port 108 and the dock port 110), to communicate with each other to determine capabilities of the respective devices. Based on the configuration setting received by the electronic device 102, the electronic device mode controller 118 can indicate to the dock mode controller 124 the mode of operation that is to be employed at the dock 104. As a result, the dock mode controller 124 provides the mode control indication 126 to the dock interconnect controller 122 to set the corresponding mode of operation of the dock interconnect controller 122.

As further shown in FIG. 1, the dock has device ports 128 and 130, to which external devices 132 and 134 can be respectively connected. For example, the external device 134 can be a display device, and the external device 132 can be a USB device, a device capable of THUNDERBOLT 3 communications, or a device that is connected over a network cable.

Figure 2:
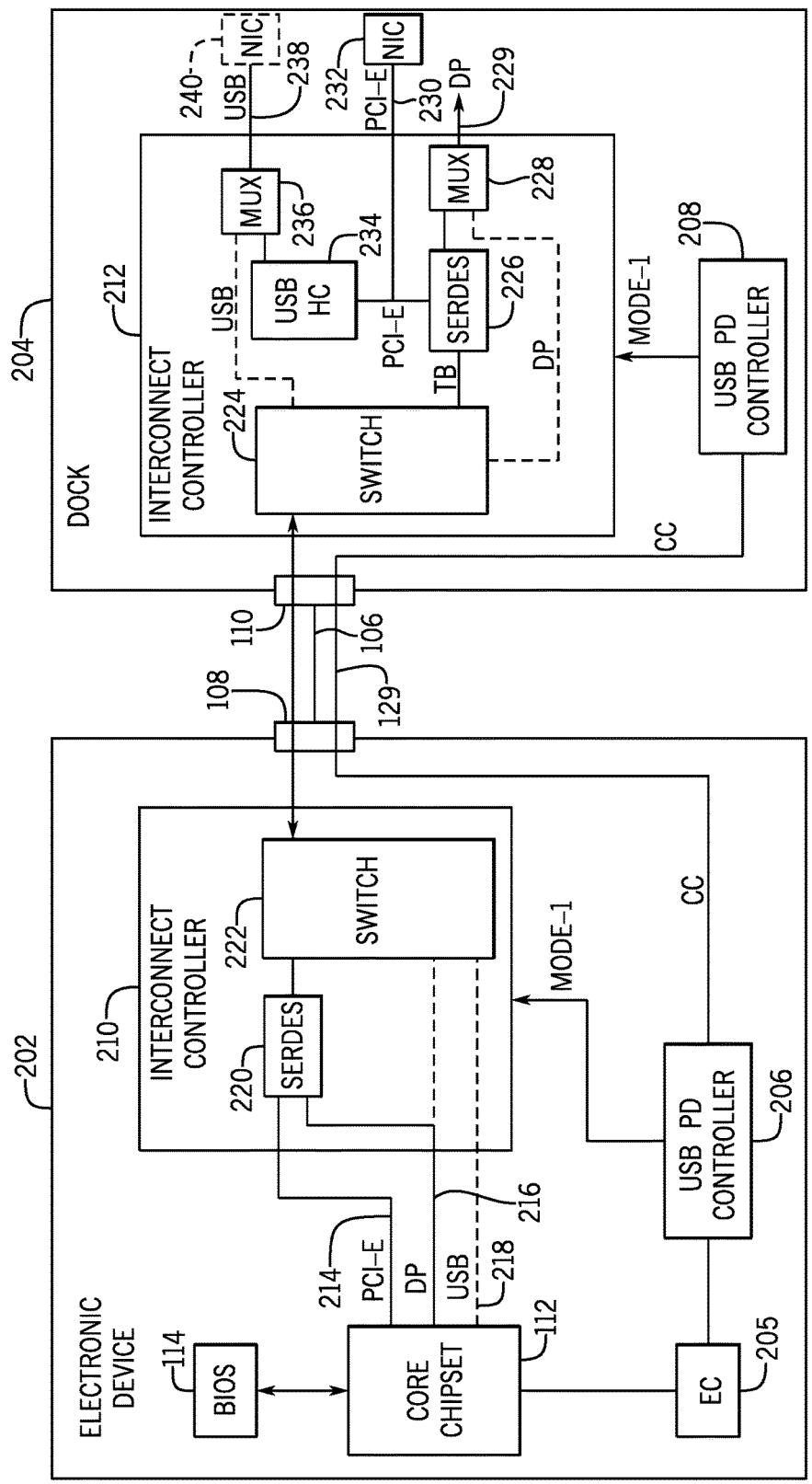
FIGS. 2-4 are block diagrams of arrangements of an electronic device and a dock in respective different modes of operation, according to further examples.
Figure 3:
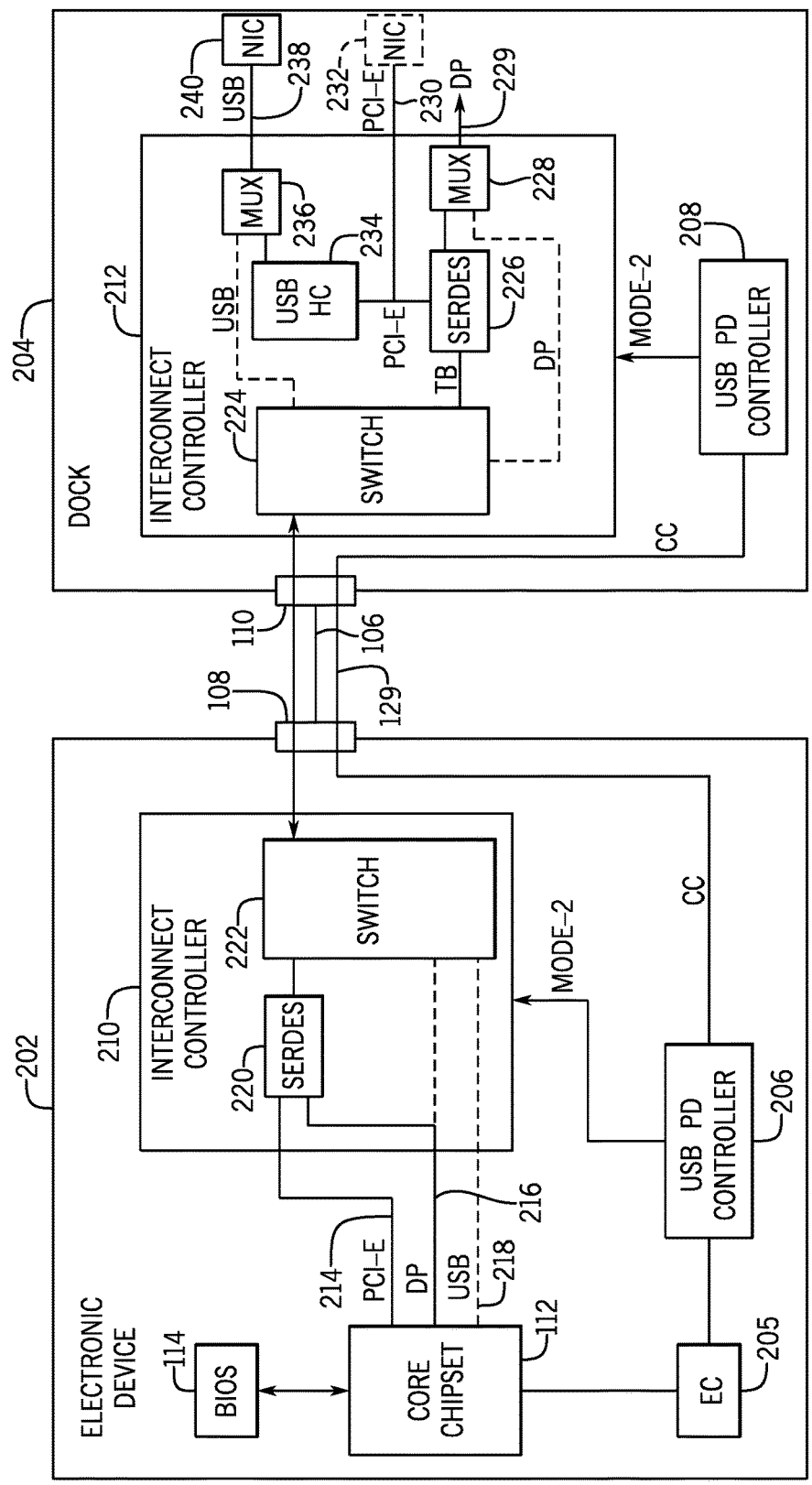
Figure 4:
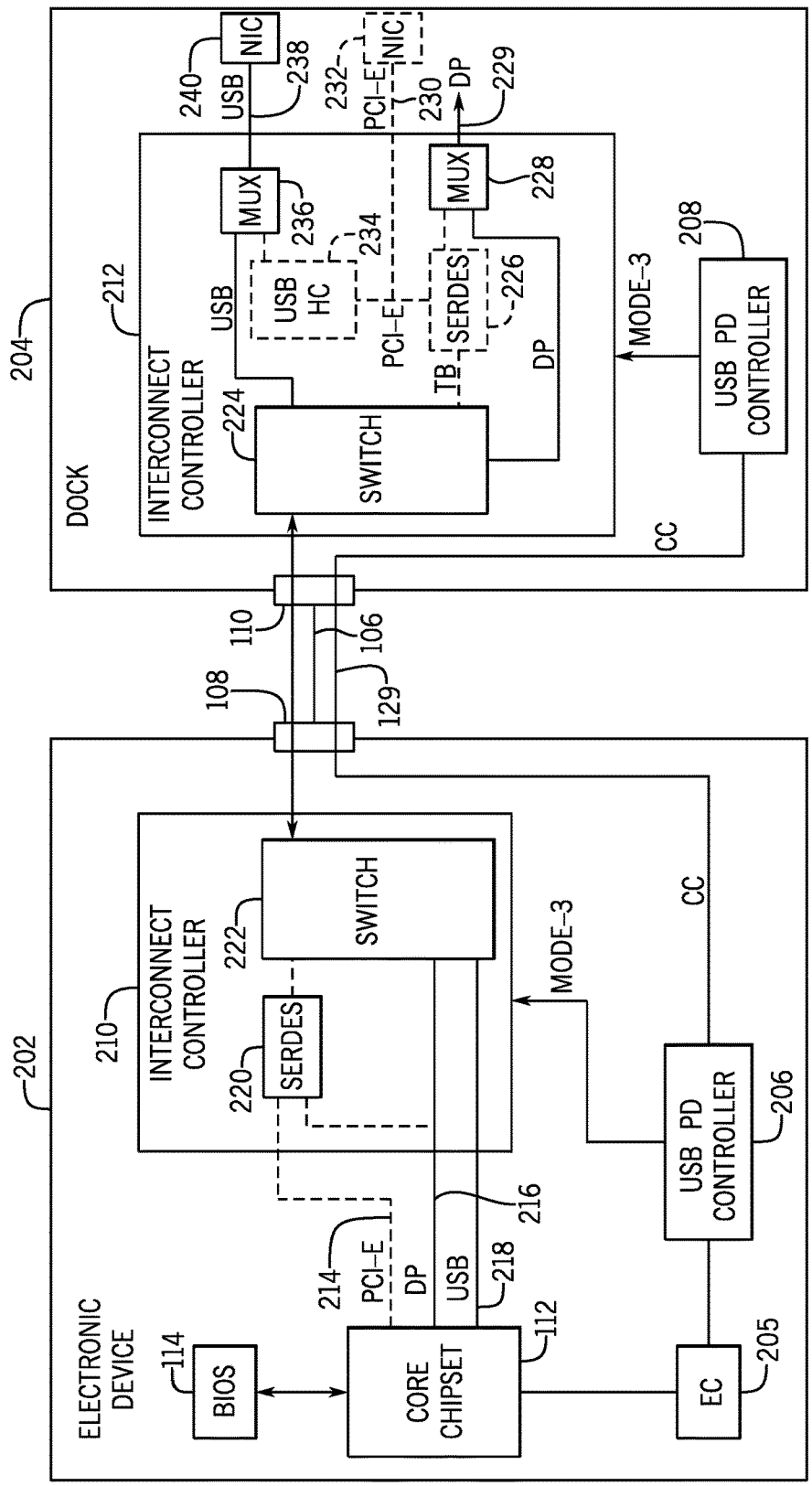

FIGS. 2-4 are block diagrams of example arrangements each including an electronic device 202 and a dock 204. In examples according to each of FIGS. 2-4, the electronic device 202 includes a USB PD controller 206, and the dock 204 includes a USB PD controller 208. The USB PD controllers 206 and 208 are examples of the mode controllers 118 and 124, respectively, shown in FIG. 1. The electronic device 102 further includes a BIOS module 114, a core chipset 112, and an interconnect controller 116.

The electronic device 202 further includes an embedded controller (EC) 205, which is a microcontroller used to perform various tasks of the electronic device 202. In the examples according to FIG. 2, the USB PD controller 206 is coupled to the core chipset 112 through the embedded controller 205. In other examples, the USB PD controller 206 can be connected directly or through another component to the core chipset 112.

A cable 106 can be used to interconnect a port 108 of the electronic device 202 and a port 110 of the dock 204. Assuming that the cable 106 is a USB-C cable, the USB PD controller 206 is able to communicate with the USB PD controller 208 over the USB Configuration Channel 129 of the USB-C cable. As discussed above, the USB PD controller 208 of the dock 204 can communicate with the USB PD controller 206 to determine the mode of operation to set for the dock 204.

The electronic device 202 further includes an interconnect controller 210, and the dock 204 includes an interconnect controller 212. In some examples, the interconnect controllers 210 and 212 can include THUNDERBOLT 3 controllers. More generally, the interconnect controllers 210 and 212 are controllers that support high-speed communications and multiple protocols. The interconnect controller 210 in the electronic device 202 is able to communicate with the interconnect controller 212 in the dock 204 over the cable 106. Although specific components are shown as part of the interconnect controllers 210 and 212 in FIGS. 2-4, it is noted that in other examples, the interconnect controllers 210 and 212 can include different components.

If high-speed, multi-protocol communications (e.g., THUNDERBOLT 3 communications) between the electronic device 202 and 204 are enabled, then the interconnect controller 210 and the interconnect controller 212 are able to perform the high-speed, multi-protocol communications.

In examples where the cable 106 is a USB-C cable, the USB-C cable includes four high-speed data paths. The interconnect controllers 210 and 212 can bond two data paths together in each direction over the cable 106, to create a first high speed path from the interconnect controller 210 to the interconnect controller 212, and a second high speed path in the reverse direction from the interconnect controller 212 to the interconnect controller 210.

In accordance with some implementations of the present disclosure, the interconnect controllers 210 and 212 can be selectively set to operate in one of multiple different modes of operation. In a first mode of operation (mode 1), both high-speed, multi-protocol communications (e.g., THUNDERBOLT 3 communications) and remote management (e.g., remote management provided by an AMT) are enabled. In a second mode of operation (mode 2), high-speed, multi-protocol communications are enabled, but remote management is disabled. In a third mode of operation (mode 3), both high-speed, multi-protocol communications and remote management are disabled.

Although examples refer to three specific modes of operation, it is noted that there can be a different number of modes of operations in other examples.

FIG. 2 shows an example of the first mode of operation (mode 1), where both high-speed, multi-protocol communications and remote management are enabled. The USB PD controller 206 outputs a Mode-1 indication to set the interconnect controller 210 in the electronic device 202 to operate in mode 1, and the USB PD controller 208 outputs a Mode-1 indication to set the interconnect controller 212 in the dock 204 to operate in mode 1.

As shown in FIG. 2, three paths are provided between the core chipset 112 and the interconnect controller 210 in the electronic device 202. The three paths include a PCI-E bus 214, a DP bus 216, and a USB bus 218.

Since mode 1 is selected by the USB PD controller 206 (as indicated by a Mode-1 indication output by the USB PD controller 206), the PCI-E bus 214 and the DP bus 216 are enabled (i.e., they are used to carry data between the core chipset 112 and the interconnect controller 210), while the USB bus 218 is disabled (i.e., the USB bus 218 does not carry data between the core chipset 112 and the interconnect controller 210).

In each of FIGS. 2-4, a solid line between components, such as the solid lines for the PCI-E bus 214 and DP bus 216, indicates that the respective bus or communications path is enabled and used. However, a dashed line between components (such as the dashed line for the USB bus 218 in FIG. 2) indicates that the respective bus or communications path is disabled or not used.

The interconnect controller 210 includes a serializer/deserializer (SERDES) 220, which can convert a parallel input into a serial output, and vice versa. In mode 1 as shown in FIG. 2, signals of the PCI-E bus 214 and the DP bus 216 are passed to the SERDES 220, which outputs the PCI-E and DP signals through a switch 222 of the interconnect controller 210 over the cable 106 to a switch 224 in the interconnect controller 212 of the dock 104.

With mode 1 enabled, the PCI-E and DP signals received over the cable 106 by the switch 224 are routed through a SERDES 226 to a multiplexer 228 in the interconnect controller 212 of the dock 204. The multiplexer 228 has a first input (connected to the output of the SERDES 226) and a second input (connected to a DP output of the switch 224). The multiplexer 228 selects, based on a control input (which in the case of FIG. 2 is responsive to a Mode-1 indication provided by the USB PD controller 208), one of its inputs to provide as output over a DP bus 229 in the dock 204. The DP bus 229 can be connected to a port to which a display device can be connected.

The SERDES 226 also outputs PCI-E signals over a PCI-E bus 230 to a PCI-E network interface controller (NIC) 232 and to a USB host controller 234 in the interconnect controller 212. The NIC 232 is connected to the PCI-E bus 230, and thus is referred to as a PCI-E NIC. The PCI-E NIC 232 is used to support remote management, for example.

The USB host controller 234 connected to the PCI-E bus 230 has an output connected to one input of the multiplexer 236, which has another input connected to the USB output of the switch 224. The multiplexer 236 selects, based on a control input (which in the case of FIG. 2 is responsive to a Mode-1 indication provided by the USB PD controller 208), one of its inputs to provide as output over a USB bus 238 in the dock 204. In response to the Mode-1 indication, the USB host controller 234 is connected through the multiplexer 236 to the USB bus 238. The USB bus 238 can be connected to a port to which a USB device can be connected. The USB host controller 234 can direct communications of USB devices over the USB bus 238.

In addition, a NIC 240 is also connected to the USB bus 238. The NIC 240 is referred to as a USB NIC. Since the dock 204 is set to mode 1 in FIG. 2, the PCI-E NIC 232 is enabled, in response to the Mode-1 indication, while the USB NIC 240 is disabled (drawn in dashed profile), in response to the Mode-1 indication. In mode 1, communications of the electronic device 202 over a network connected to the dock 204 occurs using the PCI-E NIC 232 of the dock 204.

FIG. 3 shows an example where each of the USB PD controllers 206 and 208 outputs a Mode-2 indication to select the second mode of operation (mode 2) of the respective interconnect controller 210 and interconnect controller 212. In mode 2, high-speed, multi-protocol communications (e.g., THUNDERBOLT communications) are enabled, but remote management is disabled.

In mode 2, the PCI-E bus 214 and the DP bus 216 between the core chipset 112 and the interconnect controller 210 of the electronic device 202 are enabled, but the USB bus 218 is disabled. In the interconnect controller 212 of the dock 204, similar internal paths of the interconnect controller 212 are enabled as in the case for mode 1 shown in FIG. 2, except that in mode 2, the USB NIC 240 connected to the USB bus 238 is enabled in response to the Mode-2 indication, but the PCI-E NIC 232 connected to the PCI-E bus 230 is disabled in response to the Mode-2 indication.

FIG. 4 shows an example where each of the USB PD controller 206 and USB PD controller 208 outputs a Mode-3 indication to the respective interconnect controller 210 and interconnect controller 212 to select the third mode of operation (mode 3). In mode 3, both high-speed, multi-protocol communications (e.g., THUNDERBOLT communications) and remote management are disabled.

In mode 3, the PCI-E bus 214 between the core chipset 112 and the interconnect controller 210 of the electronic device 202 is disabled, but the DP bus 216 and the USB bus 218 are enabled. In mode 3, the DP bus 216 and the USB bus 218 are connected to the switch 222 (without passing through the SERDES 220 in the interconnect controller 210).

In the interconnect controller 212 of the dock 204, the USB host controller 234, the SERDES 226, and the PCI-E bus are inactive. The multiplexer 228 is controlled (in response to the Mode-3 indication) to select the DP input from the switch 224, while the multiplexer 236 is controlled (in response to the Mode-3 indication) to select a USB input from the switch 224.

In mode 3, the PCI-E NIC 232 connected to the PCI-E bus 230 is disabled (in response to the Mode-3 indication), but the USB NIC 240 connected to the USB bus 238 is enabled (in response to the Mode-3 indication).

Figure 5:
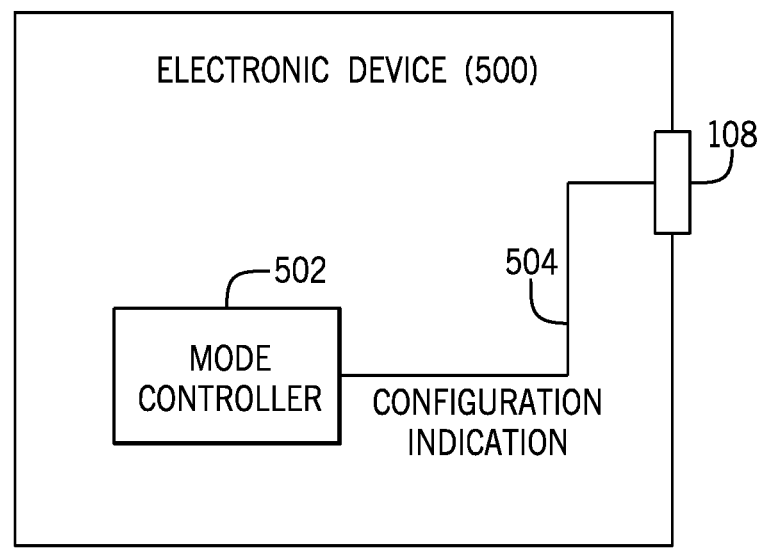
FIG. 5 is a block diagram of an electronic device according to some examples.

FIG. 5 is a block diagram of an example electronic device 500, which can be the electronic device 102 of FIG. 1 or the electronic device 202 of each of FIGS. 2-4. The electronic device 500 includes a port 108 that is to communicate over a USB-C bus (or other bus) with a universal dock (e.g., the dock 104 of FIG. 1 or the dock 204 of each of FIGS. 2-4) that is capable of interacting with multiple different types of electronic devices.

The electronic device 500 further includes a mode controller 502, which can be the mode controller 118 of FIG. 1 or the USB PD controller 206 of each of FIGS. 2-4. The mode controller 502 is able to communicate with the universal dock over the USB-C bus through the port 108, and to send a configuration indication 504 over the USB-C bus through the port 108 to the universal dock to configure the universal dock to operate according to a selected mode of multiple different modes of operation. The configuration indication 504 can include a signal, an information element (such as a bit or series of bits), or a message, which is received by the mode controller in the dock to set the dock to the selected mode of operation.

Figure 6:
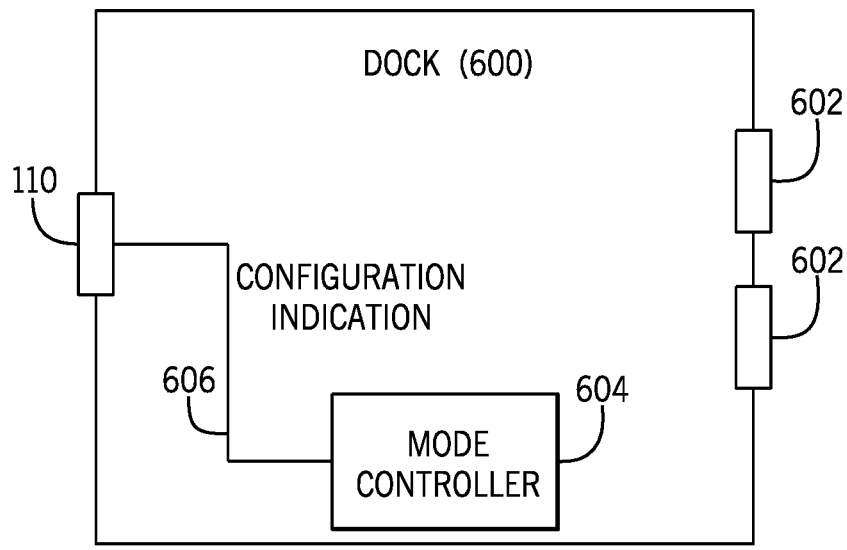
FIG. 6 is a block diagram of a dock according to some examples.

FIG. 6 is a block diagram of a dock 600 according to some examples. The dock 600 can be the dock 104 of FIG. 1 or the dock 204 of each of FIGS. 2-4, for example. The dock 600 includes device ports 602 that are able to connect to respective external devices. In addition, the dock 600 includes a dock port 110 that is able to communicate over a bus (such as the cable 106 shown in FIGS. 1-4) between the dock 600 and an electronic device. The dock 600 includes a mode controller 604, which can be the mode controller 124 of FIG. 1 or the USB PD controller 208 of each of FIGS. 2-4. The mode controller 604 is able to communicate with the electronic device over the bus between the dock and the electronic device, to receive a configuration indication 606 from the electronic device to set the dock 600 to a selected mode of multiple different modes of operation, and to configure the dock according to the selected mode. Configuring the dock to the selected mode includes any or some combination of the following: setting which paths are enabled or disabled, controlling multiplexers, enabling or disabling components such as NICs, and so forth. Examples of such configuring are shown in FIGS. 2-4.

Figure 7:
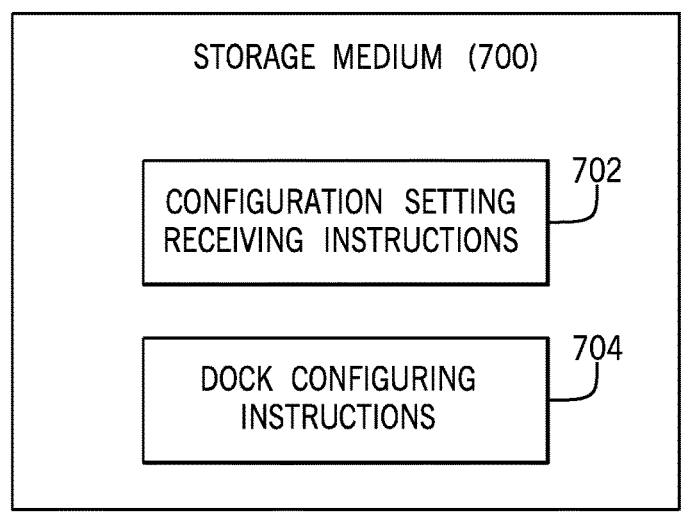
FIG. 7 is a block diagram of a storage medium storing machine-readable instructions according to some examples.

FIG. 7 is a block diagram of a non-transitory machine-readable or computer-readable storage medium 700 that stores machine-readable instructions that upon execution cause an electronic device to perform respective tasks. The machine-readable instructions include configuration setting receiving instructions 702 that can receive a configuration setting that is configurable to a first setting to indicate a first mode of operation, and a second setting to indicate a second mode of operation, where a feature supported by the first mode of operation is disabled in the second mode of operation. The machine-readable instructions further include dock configuring instructions 704 that can configure a dock to which the electronic device is connected to operate according to a mode indicated by the configuration setting.

The storage medium 700 can include any or some combination of the following: a semiconductor memory device such as a dynamic or static random access memory (DRAM or SRAM), an erasable and programmable read-only memory (EPROM), an electrically erasable and programmable read-only memory (EEPROM) or a flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium storing instructions that upon execution cause an electronic device to:
   receive a configuration setting that is configurable to a first setting to indicate a first mode of operation, and a second setting to indicate a second mode of operation, wherein a feature supported by the first mode of operation is disabled in the second mode of operation; and
   configure a dock to which the electronic device is connected to operate according to a mode indicated by the configuration setting, wherein configuring the dock to the first mode allows for remote management of the electronic device over a network from a remote device, the remote management of the electronic device over the network from the remote device comprising the remote device remotely powering up or down the electronic device, or the remote device booting the electronic device, and wherein configuring the dock to the second mode disables the remote management of the electronic device over the network.

2. The non-transitory machine-readable storage medium of claim 1, wherein configuring the dock comprises configuring a universal dock useable with different types of electronic devices.

3. The non-transitory machine-readable storage medium of claim 1, wherein configuring the dock to the first mode allows for communication between the electronic device with another device using high-speed, multi-protocol communications, the high-speed, multi-protocol communications supporting using a plurality of different communication protocols, and wherein configuring the dock to the second mode disables communication between the electronic device with another device using high-speed, multi-protocol communications.

4. The non-transitory machine-readable storage medium of claim 1, wherein receiving the configuration setting comprises receiving the configuration setting responsive to a user selection to set an operation of the electronic device to a selected mode of a plurality of different modes.

5. The non-transitory machine-readable storage medium of claim 1, wherein receiving the configuration setting comprises receiving the configuration setting responsive to a Basic Input/Output System (BIOS) setting.

6. The non-transitory machine-readable storage medium of claim 1, wherein the instructions upon execution cause the electronic device to:
   communicate, between the electronic device and the dock configured to the mode indicated by the configuration setting, over a Universal Serial Bus Type C (USB-C) bus.

7. The non-transitory machine-readable storage medium of claim 6, wherein the communicating is over a Configuration Channel of the USB-C bus.

8. The non-transitory machine-readable storage medium of claim 1, wherein configuring the dock comprises sending a configuration indication to the dock.

9. The non-transitory machine-readable storage medium of claim 1, wherein configuring the dock comprises sending a control indication to a first interconnect controller of the electronic device and to a second interconnect controller of the dock, the control indication to set the first and second interconnect controllers to operate in the mode indicated by the configuration setting.

10. The non-transitory machine-readable storage medium of claim 1, wherein the dock comprises a first network interface controller (NIC) to support the first mode of operation, and a second NIC to support the second mode of operation,
   wherein responsive to the configuration setting indicating the first mode of operation, the configuring of the dock comprises enabling the first NIC and disabling the second NIC, and
   wherein responsive to the configuration setting indicating the second mode of operation, the configuring of the dock comprises disabling the first NIC and enabling the second NIC.

11. A dock comprising:
   a plurality of ports to connect to respective devices;
   a dock port to communicate over a bus between the dock and an electronic device;
   a first network interface controller to support a first mode of operation of the electronic device connected to the dock;
   a second network interface controller to support a second mode of operation of the electronic device connected to the dock, wherein the first and second modes of operation are part of a plurality of different modes of operation; and a mode controller to:
communicate with the electronic device over the bus between the dock and the electronic device,
receive a configuration indication from the electronic device to set the dock to a selected mode of the plurality of different modes of operation,
configure the dock according to the selected mode,
enable the first network interface controller and disable the second network interface controller in response to configuring the dock according to the first mode of operation, and
disable the first network interface controller and enable the second network interface controller in response to configuring the dock according to the second mode of operation.

12. The dock of claim 11, wherein the first network interface controller is a Peripheral Component Interconnect Express (PCI-E) network interface controller, and the second network interface controller is a Universal Serial Bus network interface controller.

13. The dock of claim 11, wherein the first mode of operation comprises a remote management of the electronic device by a remote device using the first network interface controller, the remote management comprising the remote device remotely powering up or down the electronic device, or the remote device booting the electronic device.

14. The dock of claim 11, wherein the first mode of operation supports multi-protocol communications between the dock and the electronic device, the multi-protocol communications supporting using a plurality of different communication protocols between the dock and the electronic device.

15. An electronic device comprising:
a port to communicate over a Universal Serial Bus Type C (USB-C) bus with a universal dock capable of interacting with a plurality of different types of electronic devices; and
a mode controller to:
communicate with the universal dock over the USB-C bus through the port, and
send a configuration indication over the USB-C bus through the port to the universal dock to configure the universal dock to operate according to a selected mode of a plurality of different modes of operation, wherein the configuration indication when set to a first value configures the universal dock to operate according to a first mode of operation enabling remote management of the electronic device over a network from a remote device, the remote management comprising the remote device remotely powering up or down the electronic device, or the remote device booting the electronic device, and
wherein the configuration indication when set to a second value configures the universal dock to operate according to a second mode of operation disabling the remote management of the electronic device over the network from the remote device.

16. The electronic device of claim 15, wherein the communicating and the sending of the configuration indication are according to a Power Delivery (PD) protocol over a Configuration Channel of the USB-C bus.

17. The electronic device of claim 15, wherein the first mode of operation supports multi-protocol communications between the universal dock and the electronic device, the multi-protocol communications supporting using a plurality of different communication protocols over the USB-C bus between the universal dock and the electronic device.

18. The electronic device of claim 15, wherein the universal dock comprises a first network interface controller (NIC) to support the first mode of operation, and a second NIC to support the second mode of operation,
wherein responsive to the configuration indication being set to the first value, the universal dock is configured to enable the first NIC and disable the second NIC, and
wherein responsive to the configuration indication being set to the second value, the universal dock is configured to disable the first NIC and enable the second NIC.

* * * * *